United States Patent [19]

Okuno et al.

[11] Patent Number: 5,525,443
[45] Date of Patent: Jun. 11, 1996

[54] NON-AQUEOUS SECONDARY ELECTROCHEMICAL BATTERY

[75] Inventors: Hiromi Okuno, Osaka; Hizuru Koshina, Neyagawa; Akiyoshi Morita, Takaishi, all of Japan

[73] Assignee: Matsushita Electric Industrial Co., Ltd., Osaka, Japan

[21] Appl. No.: 77,327

[22] Filed: Jun. 14, 1993

Related U.S. Application Data

[63] Continuation of Ser. No. 692,594, Apr. 29, 1991, abandoned.

[30] Foreign Application Priority Data

Oct. 25, 1990 [JP] Japan .................................. 2-289150
Nov. 5, 1990 [JP] Japan .................................. 2-300765

[51] Int. Cl.$^6$ ............................................. H01M 10/40
[52] U.S. Cl. .......................... 429/194; 429/197; 429/199; 429/218; 429/221; 429/223; 429/224
[58] Field of Search .............................. 429/194, 218, 429/197, 199, 221, 223, 224

[56] References Cited

U.S. PATENT DOCUMENTS

| | | | |
|---|---|---|---|
| 3,873,369 | 3/1975 | Kamenski | 136/83 |
| 3,945,848 | 3/1976 | Dey et al | 136/100 |
| 4,056,663 | 11/1977 | Schlaikjer | 429/197 |
| 4,198,476 | 4/1980 | Di Salvo, Jr. et al. | 429/194 |
| 4,357,215 | 11/1982 | Goodenough et al. . | |
| 4,423,125 | 12/1983 | Basu | 429/194 |
| 4,463,071 | 7/1984 | Gifford et al. | 429/194 |
| 4,497,726 | 2/1985 | Brule et al. | 252/182 |
| 4,702,977 | 10/1987 | Hiratsuka et al. | 429/114 |
| 4,751,160 | 6/1988 | Plichta et al. . | |
| 4,804,596 | 2/1989 | Ebner et al. . | |
| 4,957,833 | 9/1990 | Daijuku et al. | 429/114 |
| 5,053,297 | 10/1991 | Yamahira et al. | 429/194 |
| 5,079,109 | 1/1992 | Takami et al. | 429/197 |
| 5,110,696 | 5/1992 | Shokoohi et al. | 429/218 |
| 5,153,082 | 10/1992 | Ogino et al. | 429/194 |

FOREIGN PATENT DOCUMENTS

| | | |
|---|---|---|
| 0364626 | 12/1988 | European Pat. Off. . |
| 2316757 | 5/1976 | France . |
| 63-121260 | 5/1988 | Japan . |
| 2148665 | 7/1990 | Japan . |

OTHER PUBLICATIONS

M. Stanley Whittingham, The Role of Ternary Phases in Cathode Reactions, *J. Electrochem Soc.*, vol. 123, No. 3, pp. 215–320, Mar., 1976.

J. R. Dahn, Rechargeable LiNiO$_2$/Carbon Cells, *J. Electrochem, Soc.*, vol. 138, No. 8, Aug. 1991.

Search Report from European Patent application 91107009.2 (which corresponds to the present application).

*Primary Examiner*—M. Nuzzolillo
*Attorney, Agent, or Firm*—Ratner & Prestia

[57] ABSTRACT

A non-aqueous secondary electrochemical battery which comprises a complex oxide containing lithium for a cathode, a carbon material for an anode, and a mixed solvent for an electrolyte is disclosed. The mixed solvent is obtained by dissolving an inorganic salt in a mixture of a cyclic ester and a chain ester. The cyclic ester is selected from the group consisting of ethylene carbonate, propylene carbonate, butylene carbonate, and γ-butyrolactone. The chain ester is selected from the group consisting of diethyl carbonate, dimethyl carbonate, ethyl formate, methyl formate, ethyl acetate, methyl acetate, and dimethyl sulfoxide. In this way, a non-aqueous secondary electrochemical battery having improved cycle life capabilities, discharge performance, and low temperature performance can be obtained.

6 Claims, 2 Drawing Sheets

NON-AQUEOUS SECONDARY ELECTROCHEMICAL BATTERY

This application is a continuation of application Ser. No. 07/692,594 filed Apr. 29, 1991, now abandoned.

BACKGROUND OF THE INVENTION

1. Field of the Invention

The present invention relates to a non-aqueous secondary electrochemical battery comprising a complex oxide containing lithium for a cathode and a carbon material for an anode, and more particularly, to a non-aqueous secondary electrochemical battery having improved cycle life capabilities, discharge performance, and low temperature performance.

2. Description of the Prior Art

Recently, various kinds of portable or cordless electronic equipment have been developed one after another, and as a power source for driving these equipment, the demand for small-sized and lightweight secondary batteries which have high energy density has increased. In this respect, because of their high voltage and high energy density, non-aqueous secondary lithium batteries have been desired.

As for secondary batteries, nickel-cadmium batteries and lead acid batteries having excellent performance capabilities are commercially available. Therefore, when non-aqueous electrochemical batteries are used as secondary batteries, it is desired that cathode active materials for these batteries have high energy density, that is, high capacity and high potential.

As a cathode active material, a complex oxide containing lithium is well known. For example, U.S. Pat. No. 4,357,215 discloses a battery comprising $LiCoO_2$ as an active material for a cathode.

On the other hand, U.S. Pat. No. 4,423,125 discloses a non-aqueous electrochemical battery which comprises a carbon material for an anode instead of lithium metals or lithium alloys. Since this battery uses carbon material capable of occluding and releasing lithium ions, it exhibits safety and good cycle life capability.

Moreover, Japanese Laid-Open Patent Publication No. 63-121260 discloses a combination of these U.S. Patents, in which $LiCoO_2$ and a carbon material are used for a cathode and an anode, respectively.

Generally, when a lithium metal is used for an anode, active dendritic products (dendrites) produced on a surface of the anode are reacted with a non-aqueous solvent to partially decompose the solvent during charging. As a result, charge efficiency is lowered. In this system, the maximum charge efficiency is approximately in the range of 98 to 99%. The same results are also obtained when a lithium alloy is used for the anode.

When a carbon material is used for an anode, it is required that a complex oxide containing a lithium, e.g., $LiCoO_2$, be used as a cathode. Since lithium metal is not used for the anode, dendrites are not produced on the surface of the anode during charging. As a result, the cathode and anode are kept free from the passage of the dendrites through a separator, which would otherwise cause a short circuit therebetween. The battery can be prevented from igniting or exploding. In this way, the secondary battery which is safe and excellent in cycle life capabilities can be obtained. However, discharge-charge cycles involve a decomposition of a solvent for a non-aqueous electrolyte as a side reaction, which gradually deteriorates the characteristics of the battery. As a result, the charge efficiency can not become 100%.

It is assumed by the inventors that the reason for the above-mentioned side reaction is as follows:

When the carbon material is used for the anode, it is desired that lithium ion alone be intercalated between layers of the carbon material. However, the solvent which is coordinated to the lithium ion is also intercalated between the layers, and then, the solvent is partially decomposed. That is, the solvent whose molecular diameter is large is not intercalated between the layers, so that the solvent is partially decomposed at the entrance thereof.

Examples of a solvent for an electrolyte of the above-mentioned lithium battery preferably include esters such as propylene carbonate and ethylene carbonate. U.S. Pat. No. 4,805,596 also discloses that an ester-based electrolyte is preferably used when $LiCoO_2$ is used for a cathode.

One of the requirements for a solvent suitable for a lithium battery is a high dielectric constant, that is, capability of dissolving a large amount of inorganic salt which is a solute. The above-mentioned propylene carbonate and ethylene carbonate satisfy this requirement, while these esters have cyclic structures and molecular diameters that are larger compared with the width of the layers of the carbon material. Therefore, when a lithium ion is intercalated between the layers, this type of solvent is partially decomposed, resulting in the partial destruction of the carbon structure.

On the contrary, chain esters are readily intercalated between the layers because of their structure. Examples of the chain esters include dimethylformamide, acetonitrile, diethyl carbonate, and ethyl acetate. However, they also have problems. That is, dimethylformamide and acetonitrile are reactive to lithium. Although diethyl carbonate and ethyl acetate are not reactive to lithium, they have a low dielectric constant, so that they are unable to dissolve a large amount of inorganic salt.

To solve the above-mentioned problems, according to the present invention, a mixed solvent containing a cyclic ester and a chain ester is used as a solvent for an electrolyte, whereby a large amount of inorganic salt is dissolved and a lithium ion with a chain ester is readily intercalated and deintercalated between the layers of the carbon material without the decomposition of the solvent and the destruction of the carbon structure.

SUMMARY OF THE INVENTION

The non-aqueous secondary electrochemical battery of this invention, which overcomes the above-discussed and numerous other disadvantages and deficiencies of the prior art, comprises a complex oxide containing lithium for a cathode, a carbon material for an anode, and a non-aqueous electrolyte, wherein the non-aqueous electrolyte is obtained by dissolving an inorganic salt in a mixed solvent containing a cyclic ester and a chain ester.

In a preferred embodiment, the cyclic ester is at least one selected from the group consisting of ethylene carbonate, propylene carbonate, butylene carbonate, and γ-butyrolactone.

In a preferred embodiment, the chain ester is at least one selected from the group consisting of diethyl carbonate, dimethyl carbonate, ethyl formate, methyl formate, ethyl acetate, methyl acetate, and dimethyl sulfoxide.

In a preferred embodiment, the inorganic salt is at least one selected from the group consisting of lithium tetrafluoroborate, lithium hexafluorophosphate, lithium hexafluoroarsenate, lithium trifluoromethanesulfonate, and lithium perchlorate.

In a preferred embodiment, the complex oxide containing lithium is of the formula $Li_{1-x}MO_2$ ($0 \leq x <$), wherein M is a transition metal selected from the group consisting of Co, Ni, Fe, and Mn, or part of the transition metal is replaced by another kind of transition metal.

In a preferred embodiment, a mixing ratio of the chain ester to the cyclic ester (chain ester/cyclic ester) is in the range of 1 to 9 by volume.

A non-aqueous secondary electrochemical battery comprises $Li_{1-x}MO_2$ ($0 \leq x < 1$) for a cathode, a carbon material for an anode, and a non-aqueous electrolyte, wherein M is Co or part of Co is replaced by another kind of transition metal, and wherein the non-aqueous electrolyte is obtained by dissolving at least one inorganic salt selected from the group consisting of lithium tetrafluoroborate, lithium hexafluorophosphate, and lithium perchlorate in a mixed solvent containing ethylene carbonate and diethyl carbonate.

In a preferred embodiment, a mixing ratio of the diethyl carbonate to the ethylene carbonate (diethyl carbonate/ethylene carbonate) is in the range of 1 to 9 by volume.

In a preferred embodiment, a mixing ratio of the diethyl carbonate to the ethylene carbonate (diethyl carbonate/ethylene carbonate) is in the range of 1 to 4 by volume, and the lithium hexafluorophosphate is dissolved as a solute in the mixed solvent.

Thus, the invention described herein makes possible the objectives of (1) providing a non-aqueous secondary electrochemical battery which can prevent the electrolyte from decomposing, thereby protecting the layer structure of the carbon material; (2) providing a non-aqueous secondary electrochemical battery having improved cycle life capabilities; and (3) providing a non-aqueous secondary electrochemical battery having improved discharge performance and low temperature performance.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
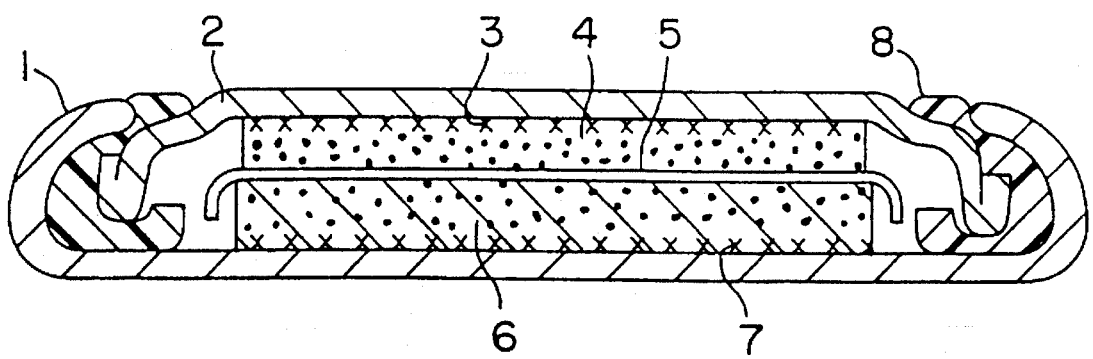
FIG. 1 is a cross-sectional view showing a typical structure of a coin-type battery according to the present invention.

FIG. 1 shows a coin-type battery of the present invention. A battery case 1 and a sealing plate 2 are both made of stainless steel. An anode collector 3 is made of nickel and attached to an inner surface of the sealing plate 2 by spot welding. An anode 4 is formed by molding an active material mainly containing carbon and is pressed onto the anode collector 3. A separator 5 is a micro-porous film formed from a polyolefin type resin having a void structure (a sponge structure) such as polypropylene, polyethylene or copolymers thereof. A cathode 6 is formed by molding a mixed agent containing a lithium-cobalt complex oxide ($LiCoO_2$) as its main active material and is pressed onto grid 7 made of titan. After the cathod 6 and the anode 4 are impregnated with electrolytes, they are coupled through the separator 5 and sealed with gaskets 8 made of polypropylene.

EXAMPLE 1

First, ethylene carbonate (hereinafter, referred to as "EC") which is a cyclic ester, and diethyl carbonate (hereinafter, referred to as "DEC") which is a chain ester, were mixed in the following volume ratios to obtain solvents for electrolytes. Then, coin-type batteries were manufactured by using the solvents so obtained. Since the melting point of EC is 36.4° C. and it solidifies at around 20° C., a battery was not manufactured by using EC alone. As a solute for the electrolyte, lithium perchlorate was used so that the concentration thereof was 1 mol/l. However the concentration of the solute for the electrolyte using DEC alone was selected as 0.5 mol/l, since DEC does not sufficiently dissolve the solute.

Battery A . . . EC:DEC=0:100
Battery B . . . EC:DEC=10:90
Battery C . . . EC:DEC=20:80
Battery D . . . EC:DEC=30:70
Battery E . . . EC:DEC=50:50
Battery F . . . EC:DEC=70:30
Battery G . . . EC:DEC=90:10

The discharge-charge cycles were repeated 100 times under the conditions that voltage for stopping charge and discharge were 4.2 V and 3.0 V, respectively, at a constant current of 1 mA. The test was performed at 20° C. The results are shown in FIGS. 2 and 3.

Figure 2:
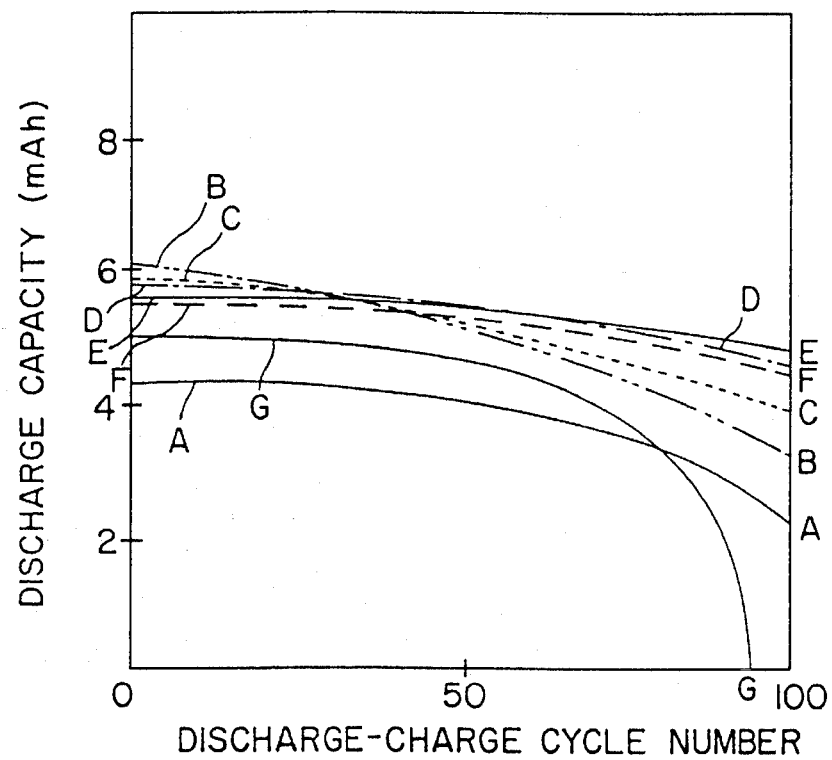
FIG. 2 is a graph showing a discharge capacity of a battery used in Example 1 against discharge and charge cycle number.

As shown in FIG. 2, the discharge performance deteriorates in the order of E, D, F, C, B, A, and G. When the chain ester was used at 100% with no addition of the cyclic ester or the cyclic ester was used at 90% with 10% of the chain ester, the discharge capacity was low. In the battery A, the degradation of the capacity was low, but the absolute value of the capacity was the smallest. In the battery G, the average discharge voltage was substantially lowered with the repetition of the discharge-charge cycles, which appeared to be responsible for the decrease of the capacity.

Figure 3:
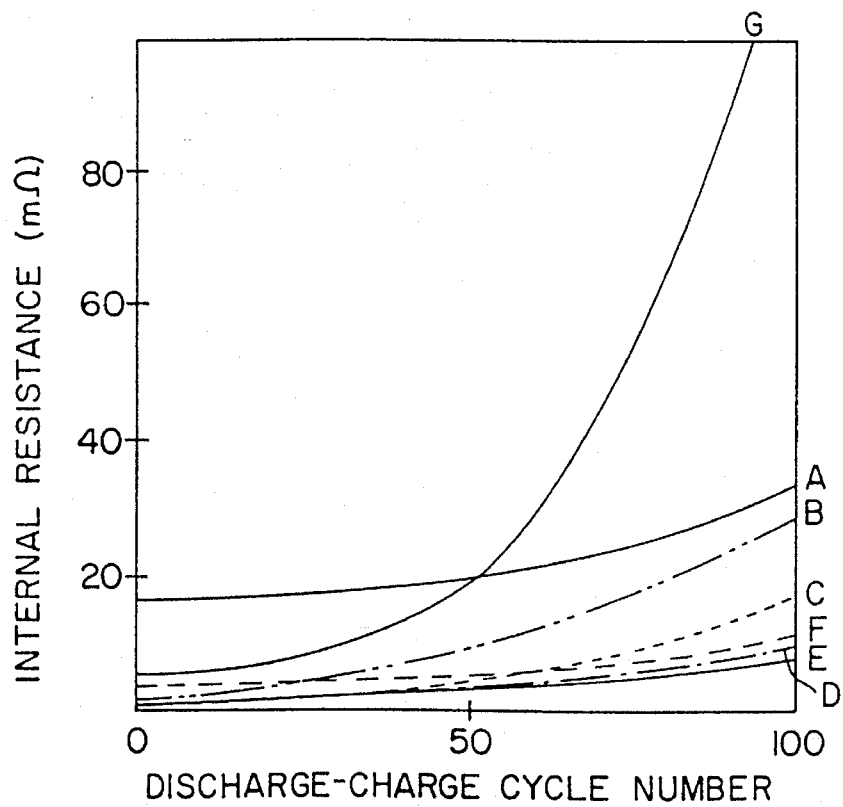
FIG. 3 is a graph showing a post-charging internal resistance of a battery used in Example 1 against discharge and charge cycle number.

Moreover, as is apparent from FIG. 3, in the battery G, the post-charging internal resistance was substantially increased with the repetition of the discharge-charge cycles, which appeared to be responsible for the decrease of the capacity.

From the above results, it is noted that when the chain ester is used alone, the total amount of the discharge capacity of the battery is small because of the high resistivity of the electrolyte. Moreover, when the cyclic ester is used in a large amount, the solvent is decomposed on the anode plate during charging. Then, the resistance of the plate is increased since the decomposed products are accumulated thereon and the discharge-charge reaction is partially concentrated on the plate due to the lack of an electrolyte, resulting in the decrease of the capacity.

Table 1 shows the states of electrolytes A to G when they were allowed to stand at −20° C. for one hour. In this table, the same reference marks as those of the batteries are used. At −20° C., electrolytes F and G were solidified, and the solutes were deposited in electrolyte A. Accordingly, in order to obtain a battery which can operate at −20° C., the mixing ratio of the solvents, i.e., DEC/EC, was preferably in the range of 1 to 9. In view of the internal resistance and discharge capacity, the mixing ratio is preferably in the range of 1 to 4.

TABLE 1

| Electrolyte | A | B | C | D | E | F | G |
| --- | --- | --- | --- | --- | --- | --- | --- |
| DEC/EC volume ratio | 100/0 | 90/10 | 80/20 | 70/30 | 50/50 | 30/70 | 10/90 |
| State at −20° C. | Liquid (a solute is partially deposited) | Liquid | Liquid | Liquid | Liquid | solid | solid |

EXAMPLE 2

The same test as Example 1 was performed except that lithium hexafluorophosphate was used as a solute for an electrolyte, and the same results were obtained. However, as a whole, the capacity was larger and the internal resistance was lower than those found in Example 1. It appeared that this phenomenon was due to the higher electrical conductivity of lithium hexafluorophosphate compared with lithium perchlorate.

Table 2 shows the states of electrolytes A to G when they were allowed to stand at −20° C. for one hour. Since the lithium hexafluorophosphate was not readily dissolved in DEC, solutes were partially deposited in electrolytes A and B. That is, when the lithium hexafluorophosphate is used, a mixing ratio (DEC/EC) is preferably in the range of 1 to 4.

TABLE 2

| Electrolyte | A | B | C | D | E | F | G |
| --- | --- | --- | --- | --- | --- | --- | --- |
| DEC/EC volume ratio | 100/0 | 90/10 | 80/20 | 70/30 | 50/50 | 30/70 | 10/90 |
| State at −20° C. | Liquid (a solute is partially deposited) | Liquid (a solute is partially deposited) | Liquid | Liquid | Liquid | solid | solid |

From the results obtained in Examples 1 and 2, it is noted that the cycle life capabilities, discharge performance, and low temperature performance of the battery are improved by using a mixed solvent of a cyclic ester and a chain ester for a non-aqueous electrolyte.

In the examples, the lithium-cobalt complex oxide represented by the general formula $Li_{1-x}CoO_2$ was used for a cathode active material. However, a compound containing lithium such as a lithium-manganese oxide represented by the general formula $Li_{1-x}Mn_2O_4$, wherein at least part of Co or Mn can be replaced by another kind of transition metal, can also be used.

Moreover, as a cyclic ester, propylene carbonate, butylene carbonate, γ-butyrolactone, or a mixture thereof can be used. As a chain ester, dimethyl carbonate, methyl carbonate, ethyl formate, methyl formate, ethyl acetate, methyl acetate, dimethyl sulfoxide, or a mixture thereof can be used. As a solute for an electrolyte, other inorganic salts such as lithium hexafluoroarsenate, lithium trifluoromethanesulfonate, lithium tetrafluoroborate, or a mixture thereof can be used.

It is understood that various other modifications will be apparent to and can be readily made by those skilled in the art without departing from the scope and spirit of this invention. Accordingly, it is not intended that the scope of the claims appended hereto be limited to description as set forth herein, but rather that the claims be construed as encompassing all the features of patentable novelty that reside in the present invention, including all features that would be treated as equivalents thereof by those skilled in the art to which this invention pertains.

What is claimed is:

1. A non-aqueous secondary electrochemical battery comprising:

a complex oxide containing lithium of the formula $Li_{1-x}MO_2$ ($0 \leq x < 1$) for a cathode, where M is a transition metal selected from the group consisting of Co, Ni, Fe, and Mn or a plurality of transition metals including one selected from the group consisting of Co, Ni, Fe, and Mn, a carbon capable of intercalating and deintercalating Li ion for an anode, and a non-aqueous electrolyte, wherein said non-aqueous electrolyte is obtained by dissolving an inorganic salt in a mixed solvent consisting of a cyclic ester and a chain ester, wherein a mixing ratio of said chain ester to cyclic ester (chain ester/cyclic ester) is in the range of 1:1 to 9:1 by volume, said non-aqueous electrolyte enabling said Li ion with chain ester to intercalate, thereby deintercalating between the layer of said carbon without destruction of the carbon structure.

2. A non-aqueous secondary electrochemical battery according to claim 1, wherein said cyclic ester is at least one selected from the group consisting of ethylene carbonate, propylene carbonate, butylene carbonate, and γ-butyrolactone.

3. A non-aqueous secondary electrochemical battery according to claim 1, wherein said chain ester is at least one selected from the group consisting of diethyl carbonate, dimethyl carbonate, ethyl formate, methyl formate, ethyl acetate, methyl acetate, and dimethyl sulfoxide.

4. A non-aqueous secondary electrochemical battery according to claim 1, wherein said inorganic salt is at least one selected from the group consisting of lithium tetrafluoroborate, lithium hexafluorophosphate, lithium hexafluoroarsenate, lithium trifluoromethanesulfonate, and lithium perchlorate.

5. A non-aqueous secondary electrochemical battery comprising:

$Li_{1-x}MO_2$ ($0 \leq x < 1$) for a cathode, where M is a transition metal selected from the group consisting of Co, Ni, Fe, and Mn or a plurality of transition metals including one selected from the group consisting of Co, Ni, Fe, and Mn, a carbon capable of intercalating and deintercalating Li ion for an anode, and a non-aqueous electrolyte, wherein said non-aqueous electrolyte is obtained by dissolving at least one inorganic salt selected from the group consisting of lithium tetrafluoroborate, lithium hexafluorophosphate, and lithium perchlorate in a mixed solvent consisting of ethylene carbonate and diethyl carbonate, wherein a mixing ratio of said diethyl carbonate to ethylene carbonate (diethyl carbonate/ethylene carbonate) is in the range of 1:1 to 9:1 by volume, said non-aqueous electrolyte enabling said Li ion with chain ester to intercalate, thereby deintercalating between the layer of said carbon without destruction of the carbon structure.

6. A non-aqueous secondary electrochemical battery according to claim 5, wherein a mixing ratio of said diethyl carbonate to ethylene carbonate (diethyl carbonate/ethylene carbonate) is in the range of 1:1 to 4:1 by volume, and said lithium hexafluorophosphate is dissolved as a solute in said mixed solvent.

* * * * *

UNITED STATES PATENT AND TRADE MARK OFFICE
CERTIFICATE OF CORRECTION

PATENT NO.   : 5,525,443
DATED        : June 11, 1996
INVENTOR(S)  : Okuno et al.

It is certified that error appears in the above-identified patent and that said Letters Patent is hereby corrected as shown below:

On the Cover page, item [56] References Cited, U.S Patent Documents, delete "Daijuku et al." and insert --Daifuku et al.--.

On the Cover page, item [56] References Cited, Other Publications, delete "M. Stanley Whittingham, The Role of Ternary Phases in Cathode Reactions, *J. Electrochem Soc.*, vol. 123, No. 3, pp. 215-320, Mar., 1976" and insert -- M. Stanley Whittingham, The Role of Ternary Phases in Cathode Reactions, *J. Electrochem Soc.*, vol. 123, No. 3, pp. 315-320, Mar., 1976--.

Signed and Sealed this

Third Day of December, 1996

*Attest:*

BRUCE LEHMAN

*Attesting Officer*   *Commissioner of Patents and Trademarks*